United States Patent [19]

Akira

[11] Patent Number: 4,815,671
[45] Date of Patent: Mar. 28, 1989

[54] CONTAINER HAVING A BUILT-IN MILL

[75] Inventor: Usuki Akira, Yokosuka, Japan

[73] Assignee: Yugen Kaisha Hamazaki Hoso, Japan

[21] Appl. No.: 122,118

[22] Filed: Nov. 17, 1987

[30] Foreign Application Priority Data

Mar. 13, 1987 [JP] Japan ................................. 62-36834

[51] Int. Cl.$^4$ .......................................... B02C 18/10
[52] U.S. Cl. .................................. 241/169.1; 241/98; 241/101 B; 241/199.12
[58] Field of Search ...................... 241/169.1, 168, 98, 241/101 B, 101.2, 199.12, 225, 245, DIG. 27

[56] References Cited

U.S. PATENT DOCUMENTS

| | | | |
|---|---|---|---|
| 1,794,214 | 2/1931 | Thurm et al. | 241/98 |
| 2,407,808 | 9/1946 | Bivans | 241/169.1 X |
| 2,688,448 | 9/1954 | Lenz | 241/169.1 |
| 2,763,440 | 9/1956 | Johnson | 241/168 X |
| 3,371,874 | 3/1968 | Reeves et al. | 241/169.1 |

Primary Examiner—Howard N. Goldberg
Assistant Examiner—Joseph M. Gorski
Attorney, Agent, or Firm—McGlew & Tuttle

[57] ABSTRACT

A container and built-in mill construction includes a hollow container with a conical guide supported in a lower part of the container. The conical guide has an opening. A cylinder is provided connected to the conical guide extending downward about the periphery of the opening. The inner periphery of the cylinder is provided with a plurality of teeth. A second plurality of teeth are provided inserted within the cylinder for rotation therein to provide a grinding action between the first plurality of teeth and second plurality of teeth. A rod is provided extending from the second plurality of teeth to an upper portion of the hollow container body. A cylindrical partition wall is provided mounted eccentrically with respect to the cylinder. A horizontal partition plate is provided above the cylindrical partition wall. A whole opening is provided in the horizontal partition plate. An agitating member is provided above the partition plate connected to the rod for rotation therewith.

4 Claims, 4 Drawing Sheets

CONTAINER HAVING A BUILT-IN MILL

BACKGROUND OF THE INVENTION

This invention relates to improvements in a container having a built-in mill wherein, for example, granular coffee beans parched in advance are contained so as to be able to be ground to be powdery when coffee is to be served.

A container having a built-in mill in a container body and capable of being conveyed while containing such grains as coffee beans is already known to have been developed, for example, by the present inventor and disclosed in a Japanese utility model application No. 310,505/1984 (laid open No. 143538/1985).

In the invention of the above mentioned application, as shown in FIG. 6, a cylindrical container body 21 of a container having a built-in mill comprises a can body 22 and a lid 23a sealing the lower part of the can body 22 and a mill 24 is built in the can body 22 so that, after such grains as coffee beans are contained, the upper part of the can boy 22 may be sealed with a lid 23b.

A mill 24 built in the can body 22 comprises a tapered wall 26 held by the inner wall of the can body 22 and a rotor 27 rotatably fitted within this wall 26. A plurality of teeth are provided formed on the inner periphery of the wall 26 and the outer periphery of the rotor 27. Rotor 27 includes a conical surface 28 opposed to the inner periphery of the wall 26 and teeth formed on this conical surface 28.

A gap 29 of an opening area made gradually narrower downward from above is formed between the inner periphery of the above mentioned wall 26 and the outer periphery of the rotor 27 and the upper and lower opening ends of the gap 29 are opened respectively inside and outside the can body 22.

A rotatable rod 31 is connected to the mill 24 through a supporting member 30 in the upper part of the can body 22. A handle 32 is removably connected to the rod 31.

According to this known device, in case the grains 25 are to be made powdery, for example, to brew coffee, when the upper and lower lids 23b and 23a are removed and the handle 32 is inserted in the upper part of the rod 31 and is rotated, the rotor 27 will rotate in the same direction. Therefore, the coffee beans dropping into the gap 29 will be rubbed to be ground by the wall 26 and the teeth provided on the conical surface 28.

However, according to the above-discussed known device, a problem arises in that, when such grains 25A; as coffee beans are light in weight and slippery on the outer surfaces, they will not enter the gap 29 but will be only agitated above the rotor 27 and, in fact, will not be able to be made powdery.

Further, the size of the grains 25 is variously large and small. There is also a disadvantage that, in case the coffee beans are large, when the rotor 27 is merely rotated, the coffee beans will not enter the gap 29 and will not be able to be ground to be powdery.

Therefore, the above mentioned gap 29 can be made large at the upper opening end so that the coffee beans may easily enter the gap 29. However, in such case, in order to make the coffee beans powdery enough, the rotor 27 must be made long and large.

However, when the rotor 27 is made long and large, the content of the coffee beans in the can body 22 will have to be reduced. In order to secure a fixed content of the coffee beans in the can body 22, the container having a built-in mill must be made long and large as a whole and will become inconvenient to convey.

SUMMARY OF THE INVENTION

Therefore, a primary object of the present invention is to provide a container having a built-in mill wherein coffee beans or the like may be ground with ease irrespective of the weight and size of the grains.

Another object of the present invention is to provide a container having a built-in mill wherein coffee beans or the like can be forcibly pushed onto teeth within the mill so as to be ground.

Still another object of the present invention is to provide a container having a built-in mill wherein a fixed content of coffee beans or the like is secured without making the container body long and large and the conveyance or the like is not inconvenient.

In order to attain the above mentioned objects, the formation of the present invention is a container having a built-in mill in a hollow container body characterized in that the mill comprises a conical guide provided in the lower part of the container body, a cylinder provided to hang in the center of the guide, first teeth provided on the inner periphery of the cylinder, second teeth inserted rotatably in the cylinder and meshing with the above mentioned first teeth and a rod connected with the second teeth, a cylindrical partition wall is eccentrically erected on the above mentioned conical guide, a horizontal partition plate is provided above the partition wall, a hole opening in a chamber sectioned by the partition wall is made in this partition plate and an agitating member connected to the rod is rotatably provided over the partition plate.

By the above mentioned formation, the operation of the present invention is as follows:

When the rod is rotated, the agitating member connected to the rod will also simultaneously rotate in the same direction and such grains as coffee beans will be led into the hole made in the partition plate.

As the hole made in the partition plate is opened in a large diameter side chamber of the chamber sectioned by the partition wall, the coffee beans or the like contained in the can body will be led through the above mentioned hole into the large diameter side chamber of the chamber sectioned by the partition wall and then will be led to the small diameter side.

By this arrangement, when the chamber is filled with the coffee beans or the like, they will go nowhere and will be forcibly pushed in and ground between the first teeth and second teeth.

Figure 1:
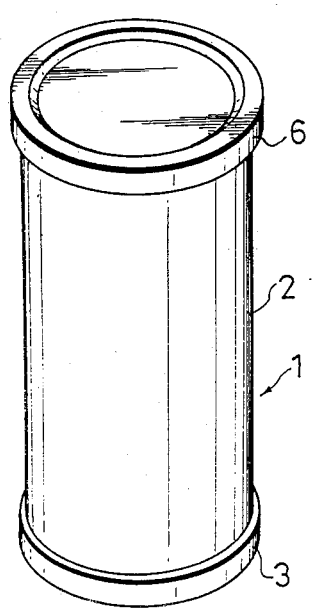
FIG. 1 is a perspective view of a container having a built-in mill as sealed embodying the present invention.
Figure 2:
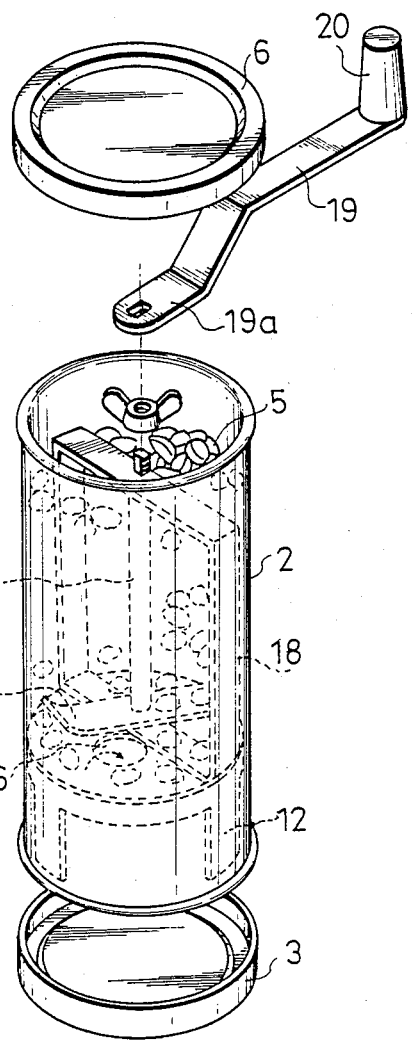
FIG. 2 is a perspective view of the same as disassembled.
Figure 3:
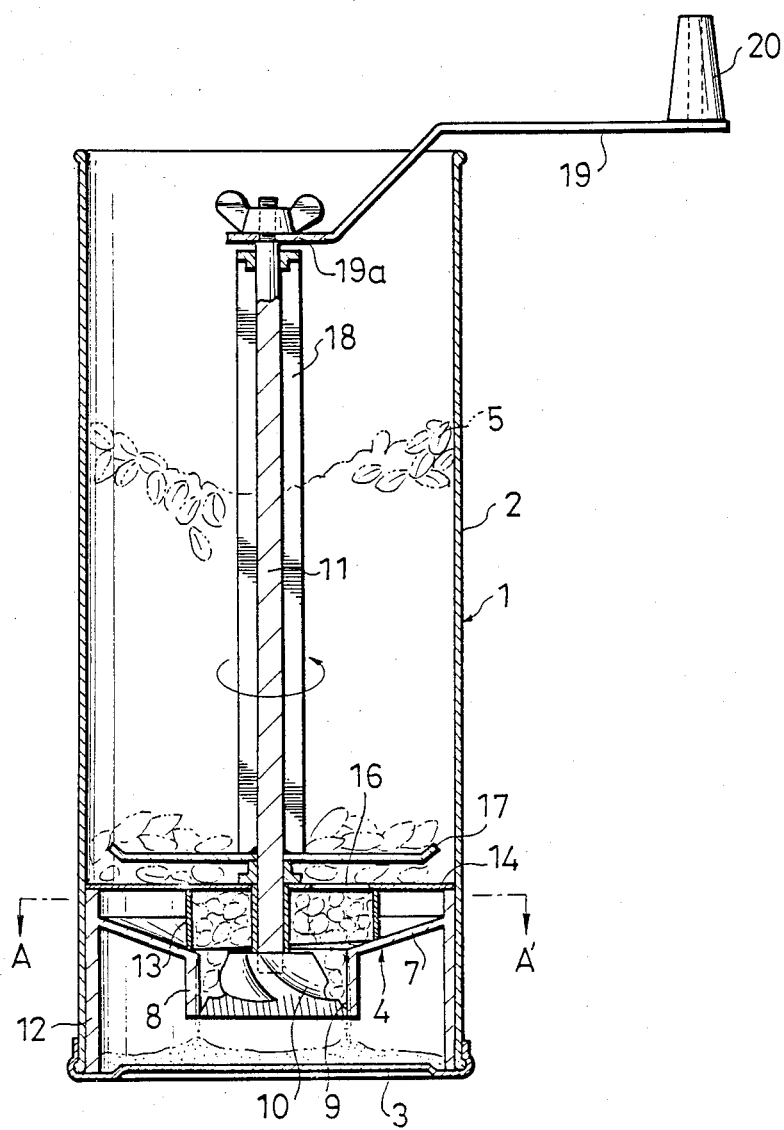
FIG. 3 is a magnified elevation of the same as vertically sectioned.
Figure 4:
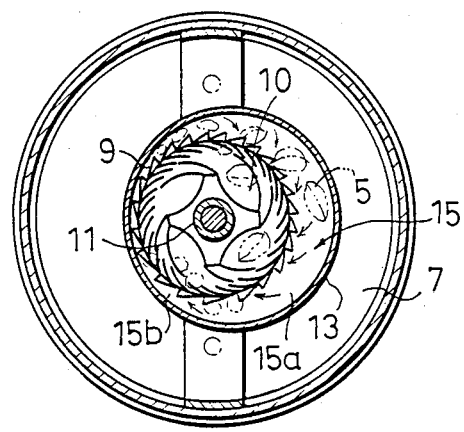
FIG. 4 is a plan view of the same as cross-sectioned on line A—A in FIG. 3.
Figure 5:
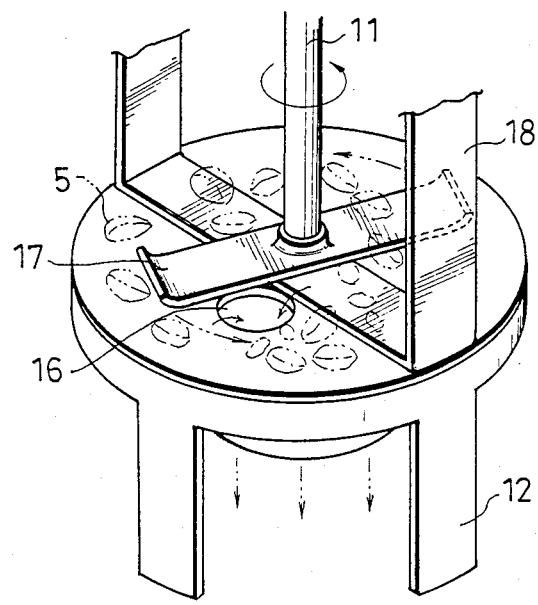
FIG. 5 is a magnified perspective view of the mill built-in the container.
Figure 6:
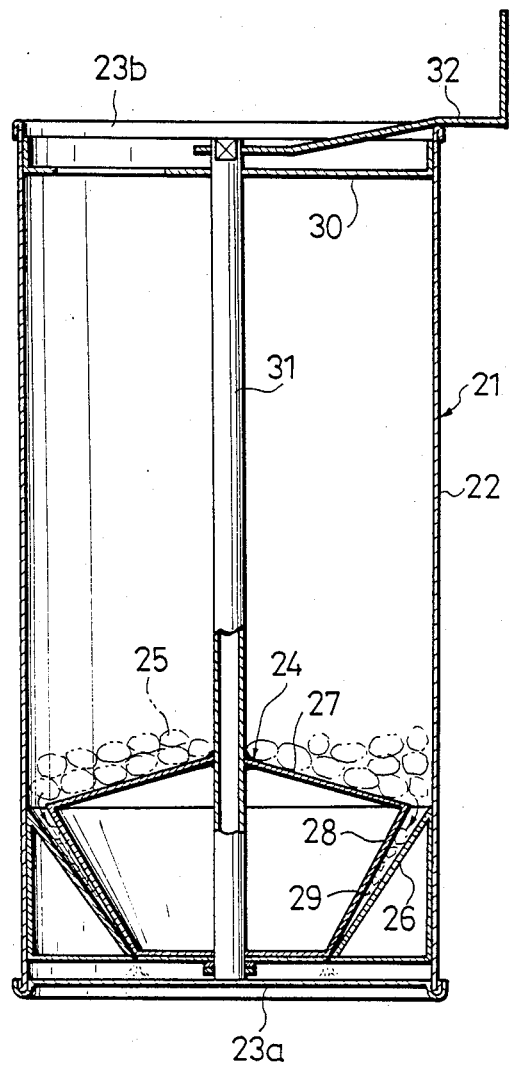
FIG. 6 is an elevation of a conventional container having a built-in mill as vertically sectioned.

DESCRIPTION OF THE PREFERRED EMBODIMENT:

An embodiment of the present invention shall be explained in the following with reference to the accompanying drawings:

As shown in FIGS. 1 to 5, a cylindrical container body 1 of a container having a built-in mill according to the present invention comprises a can body 2 and a lid 3 sealing the lower part of the can body 2 and a mill 4 is built-in the can body 2 so that, after such grains 5 as coffee beans are contained, the upper part of the can body 2 may be sealed with a lid 6.

The mill 4 built-in the can body 2 comprises a conical guide 7 provided in the lower part of the container body 1, a cylinder 8 connected to a central opening and extending downwardly from the above mentioned guide 7, first teeth portion 9 including a plurality of teeth consisting of projections or spirals formed on the inner periphery of the above mentioned cylinder 8, second teeth 10 inserted rotatably in the above mentioned cylinder 8 and meshing with the above mentioned first teeth 9.

The above mentioned conical guide 7 is supported by legs 12, a cylindrical partition wall 13 is eccentrically erected on the conical guide 7, a horizontal partition plate 14 is provided above the above mentioned partition wall 13 and a hole 16 opening in a large diameter side chamber 15a of a chamber 15 sectioned by the partition wall 13 is made in the above mentioned partition plate 14.

A plate-like agitating member 17 connected to the above mentioned rod 11 is rotatably provided over the above mentioned partition plate 14.

The rod 11 is supported by a supporting member 18 and is removably fitted in the upper part with a horizontal base end 19a of a handle 19. This handle 19 is inclined upward in the middle so that a knob 20 may be rotatable from outside the can body.

The handle 19 is to be contained in the can body 2 when it is not used and is to be taken out and connected to the rod when it is used.

When the device is needed to prepare coffee or the like, when the handle 19 is connected to the rod 11 and is rotated, the agitating member 17 connected to the rod 11 will rotate and the coffee beans contained in the can body 2 will be collected in turn toward the hole 16 by the above mentioned agitating member 17 and will be pushed in turn through the above mentioned hole 16 into the large diameter side chamber 15a of the chamber 15 sectioned by the partition wall 13.

The coffee beans thus dropped into the large diameter side chamber 15a of the chamber 15 will be agitated by the upper parts of the second teeth 10, will be moved in turn into the small diameter side chamber 15b. When the chamber 15 is filled with the coffee beans 5 until they can go nowhere, the coffee beans 5 will be forcibly pushed in and ground between the first teeth 9 and second teeth 10.

Grains and the like besides coffee beans such as soy beans, red beans and corns may be enclosed in the can body.

According to the present invention, there are the following effects:

(1) Coffee beans or the like can be easily made powdery irrespective of their weight and size.

(2) As the cylindrical partition wall is eccentrically erected on the guide, the coffee beans or the like dropped into the chamber sectioned by the partition wall will be forcibly pushed in and positively ground between the first and second teeth.

(3) A fixed content of such grains as coffee beans can be secured without making the container body long and large and no inconvenience will be caused to the conveyance.

What is claimed is:

1. A container and built-in mill construction comprising: a hollow container body; a conical guide provided in a lower part of the container body, said conical guide having a circular opening; a cylinder connected to said conical guide and extending downward about said circular opening; a first plurality of teeth formed on the inner periphery of said cylinder; a second plurality of teeth forming a toothed member inserted rotatably in said cylinder and adapted to cooperate with said first plurality of teeth to provide a grinding action; a rod connected with said toothed member and extending to an upper portion of said container body; a cylindrical partition wall connected with said conical guide and extending upward from said conical guide, said cylindrical partition wall being positioned eccentrically with respect to said circular opening of said conical guide; a horizontal partition plate connected with an upper portion of said cylindrical partition wall, said horizontal partition plate having a hole opening; and, an agitating member connected to said rod for rotation therewith, said agitation member being positioned above said partition plate.

2. A container and built-in mill construction according to claim 1, further comprising: a handle removably connected to said rod.

3. A container and built-in mill construction according to claim 1, wherein: said rod is rotatable and includes an upper portion adapted to be rotated.

4. A container and built-in mill construction according to claim 1, wherein: said cylindrical partition wall eccentrically mounted with respect to said conical guide circular opening is eccentrically mounted with respect to said rod, such that said partition wall lies at a variable distance from said rod including a minimum distance and a maximum distance, said hole opening being formed in said horizontal partition plate between said rod and said partition wall substantially at the area of the maximum distance between said rod and said partition wall.

* * * * *